Figure 1:
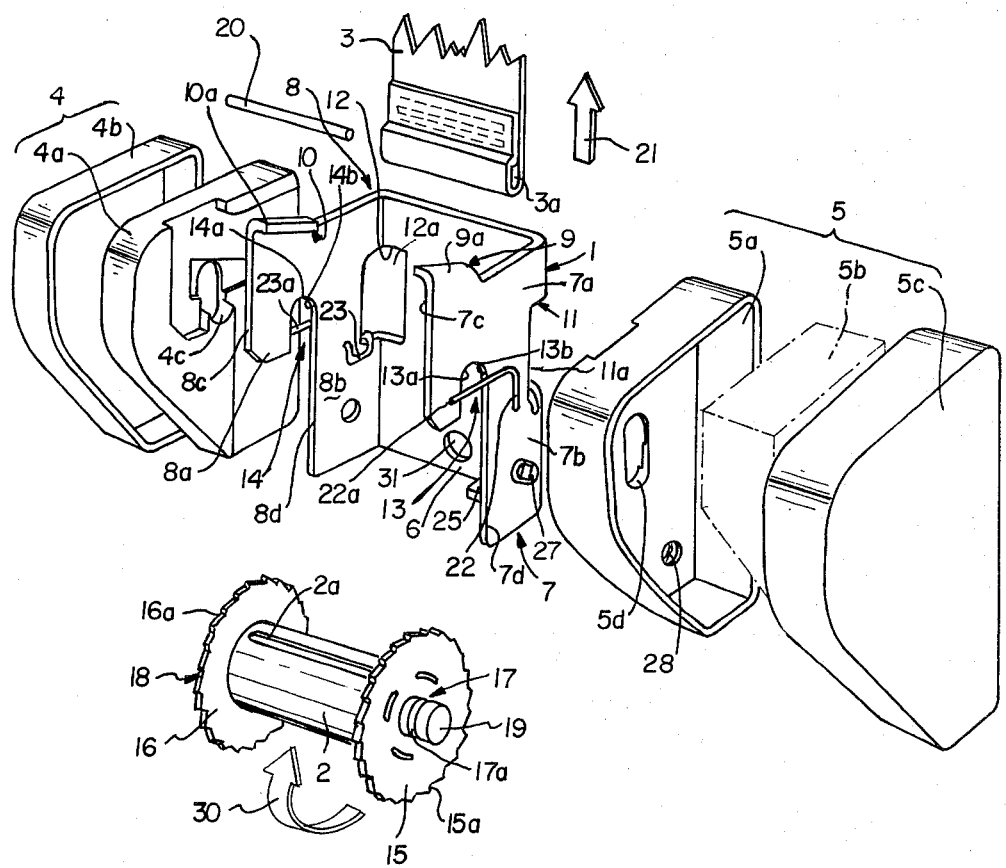

United States Patent [19]
Ernst

[11] Patent Number: 4,470,557
[45] Date of Patent: Sep. 11, 1984

[54] DEVICE FOR ROLLING-UP THE BELT OF SAFETY BELTS, IN PARTICULAR FOR MOTOR VEHICLES

[76] Inventor: Hans-Hellmut Ernst, 2061 Sulfeld, Eschenweg 4, Fed. Rep. of Germany

[21] Appl. No.: 463,887
[22] PCT Filed: May 21, 1982
[86] PCT No.: PCT/DE82/00113
§ 371 Date: Jan. 21, 1983
§ 102(e) Date: Jan. 21, 1983
[87] PCT Pub. No.: WO82/04021
PCT Pub. Date: Nov. 25, 1982

[30] Foreign Application Priority Data
May 22, 1981 [DE] Fed. Rep. of Germany ....... 3120379

[51] Int. Cl.$^3$ .................... A62B 35/02; B65H 75/48
[52] U.S. Cl. .................. 242/107.4 A; 242/107.4 C
[58] Field of Search .............. 242/107.4 C, 107.4 A, 242/107.4 B; 280/806; 297/478, 480

[56] References Cited
U.S. PATENT DOCUMENTS

| | | | |
|---|---|---|---|
| 3,074,761 | 1/1963 | Ryan | 242/107.4 C |
| 3,695,545 | 10/1972 | Peters | 242/107.4 C |
| 3,851,837 | 12/1974 | Griffin | 242/107.4 C X |
| 3,876,164 | 4/1975 | Dully | 242/107.4 C |
| 4,101,094 | 7/1978 | Wallin | 242/107.4 C X |
| 4,350,313 | 9/1982 | Adomeit | 242/107.4 C |

FOREIGN PATENT DOCUMENTS

| | | |
|---|---|---|
| 1531545 | 1/1970 | Fed. Rep. of Germany . |
| 1531546 | 1/1970 | Fed. Rep. of Germany . |
| 2256184 | 5/1974 | Fed. Rep. of Germany . |
| 2333525 | 7/1977 | France . |
| 1428111 | 3/1976 | United Kingdom . |

Primary Examiner—John M. Jillions
Attorney, Agent, or Firm—Bacon & Thomas

[57] ABSTRACT

The device for retracting the belt of safety belts, in particular for motor-vehicles, is comprised of a U-shaped housing and a winding-on shaft for the belt. The housing has a bottom as well as two parallel sides positioned at a right angle to the bottom, and is provided with two locking cams as well as two elongated slots, which in each instance extend in the one and the other side respectively, substantially parallel to the pulling-out direction of the belt, and which are closed at one end. The winding-on shaft is provided at both ends with a locking disc with locking teeth on the outer periphery, and is supported in the elongated slots of the housing in such a manner that it can turn and so that it can move crosswise against the action of a spring-loading in the pulling-out direction of the belt so as to ensure an engaging of the toothing of the locking discs with the locking cams of the housing. The two sides of the housing extend substantially over its entire length and are in each instance approximately L-shaped with a broader section in the zone adjacent to the locking cams and a narrower section in the remaining zone of the housing, the two elongated slots of the housing extending into the broader section of the housing sides and with the closed ends of the slots facing towards the locking cams.

17 Claims, 5 Drawing Figures

DEVICE FOR ROLLING-UP THE BELT OF SAFETY BELTS, IN PARTICULAR FOR MOTOR VEHICLES

The invention relates to a device for rolling-up the belt of safety belts, in particular for motor vehicles, comprising:
(a) a U-shaped housing, which has a bottom and two parallel sides positioned at a right angle to the bottom, and is provided with two locking cams as well as two closed ended elongated slots, which in each instance extend in the one and the other side generally paralell to the pulling-out direction of the belt and are closed at one end, and
(b) a winding-on shaft for the belt, which at both ends is provided with a locking disc with locking teeth on the outer periphery, and is supported in the elongated slots of the housing in such a manner that it can rotate and so that it can also move crosswise against the action of a spring-loading in the pulling-out direction of the belt, so that the teeth of the locking discs can engage in the locking cams of the housing.

Such devices are known (German Patent Publication No. 1,531,545). With these the two sides of the housing are both provided in the form of forks with two prongs, the forks being arranged at one end of the bottom of the housing, so that the prongs extend to the other end of the bottom. The winding-on shaft for the belt rests with its two outer ends in the two elongated slots of the forks, which in each instance are bounded by the two prongs of the one and the other fork and are open in the pulling-out direction of the belt. At the end facing away from the forks two struts are provided on the bottom of the housing, positioned at a right angle to same, which struts at their free ends are provided with the locking cams of the housing. The struts with the locking cams are in each instance arranged in front of the one and the other locking disc of the winding-on shaft, which are disposed towards the inner sides of each fork.

The winding-on shaft is made of two parts and consists of a central hollow shaft which is supported in the two forks, and of a drum positioned thereon in a rotatable manner, the two side walls of which are formed by the two locking discs. Between the drum and the hollow shaft a spring is arranged, which acts on the drum in the winding-on direction of the belt. At the two outer ends the hollow shaft, on both sides of the two forks, two rod-shaped levers are provided, which extend to the bottom of the housing, with the ends adjacent the bottom engaging with two projections on the bottom, i.e. on the side facing the forks. Normally the two levers hold the winding-on shaft in the two forks, so that it lies against the closed ends of the two elongated slots of the housing. However, when a sudden pull is exerted on the belt coming from the winding-on shaft in the pulling-out direction of the belt parallel to the bottom of the housing, then the winding-on shaft is pulled along so that its two locking discs engage with their teeth in the locking cams of the housing, and the winding-on shaft can no longer turn.

The aim of the invention is to create a device of the type mentioned at the outset, which can be produced, and in particular assembled, in a relatively simple and, therefore, inexpensive manner, and which notwithstanding the high mechanical strength required for a secure and reliable operation, has an only relatively small mass, and with which it should also be possible to reduce to a minimum the noises which occur during normal operation.

This aim is achieved in that
(c) the two sides of the housing extend substantially over its entire length, and in each instance are approximately L-shaped with a broader section, a narrower section, each of the broader sections having a side generally facing the narrow section of the respective housing side, and said locking cams of the housing being provided in the zone of broader sections of the housing sides
(b) the two elongated slots of the housing extending into the broader sections of the sides so that their closed ends face towards the locking cams and their open sides are situated on the side of the broader sections which faces the narrower section.

In the device according to the invention, the housing is designed in such a manner that it can to a far-reaching extent be produced mechanically, in a particular rendering possible a practically fully automatic assembling of the device, which reduces the production costs in a quite considerable manner, especially taking into account the fact that rolling-up devices for safety belts are mass-produced products. With the device according to the invention the three main components can be supplied and attached to the housing from three different directions which extend at right angles to one another.

In the case of retractor reels for safety belts, the housing made of metal, as a rule sheet steel, is the heaviest and the most expensive component. With the device according to the invention the mass of the housing has been reduced considerably, so that also the overall mass of the device is reduced to a corresponding extent, which greatly complies with the general trend of making the motor vehicles lighter so as to reduce the fuel consumption. With the device according to the invention, the housing consists practically only of the zones required for reacting forces which occur during a lock-up, i.e. when the winding-on shaft of the reel is stopped from turning and the user of the safety belt is pressed into the belt. In addition to the reduction in mass, together favourable feature of the housing of the device according to the invention is that the required amount of material is reduced, so that also in this respect costs are saved.

The fact that, in the case of a lock-up or blocking, the winding-on shaft is supported symmetrically on the housing makes it possible to keep the wall thickness of the housing relatively small. In addition to this there are the advantages described in the foregoing. A further reduction of the wall thickness of the housing is possible, when on the device according to the invention, the housing is provided with two pairs of locking cams, which is preferred. Then, as a matter of fact, in the case of a blocking the transmission of force between the winding-on shaft and the housing takes place at four points. The wall thickness of the housing can be reduced by at least 30% whilst simultaneously doing away with annealed or high-strength parts, resulting in a corresponding saving of mass and costs. Furthermore, it must be pointed out in this connection that the safety of the device according to the invention is increased by the fact that the two elongated slots of the housing are closed at the rear ends seen in the pulling-out direction of the belt, i.e. at the ends facing the locking cams of the housing, so that the winding-on shaft moving crosswise in the pulling-out direction of the belt can come to rest against these ends which ensures that it is at all times held securely in the housing.

With the device according to the invention also a design of the housing is preferred which is mirror-symmetrical with regard to the central longitudinal plane. This in particular has the advantage that the devices can then be installed in a motor vehicle in a slanting position on the left as well as on the right side, and that different designs depending on an installation on the one or the other side of the motor-vehicle become superfluous, which also results in a considerable reduction of the production costs.

The device according to the invention can readily be designed in such a manner that normally practically no audible noises occur, in that it is ensured that in the case of a normal operation there only occurs a plastic/metal or plastic/plastic contact between the winding-on shaft and the housing or other parts of the device, and that only in the case of a blocking a metal/metal contact takes place between the locking discs of the winding-on shaft and the locking cams of the housing.

Figure 2:
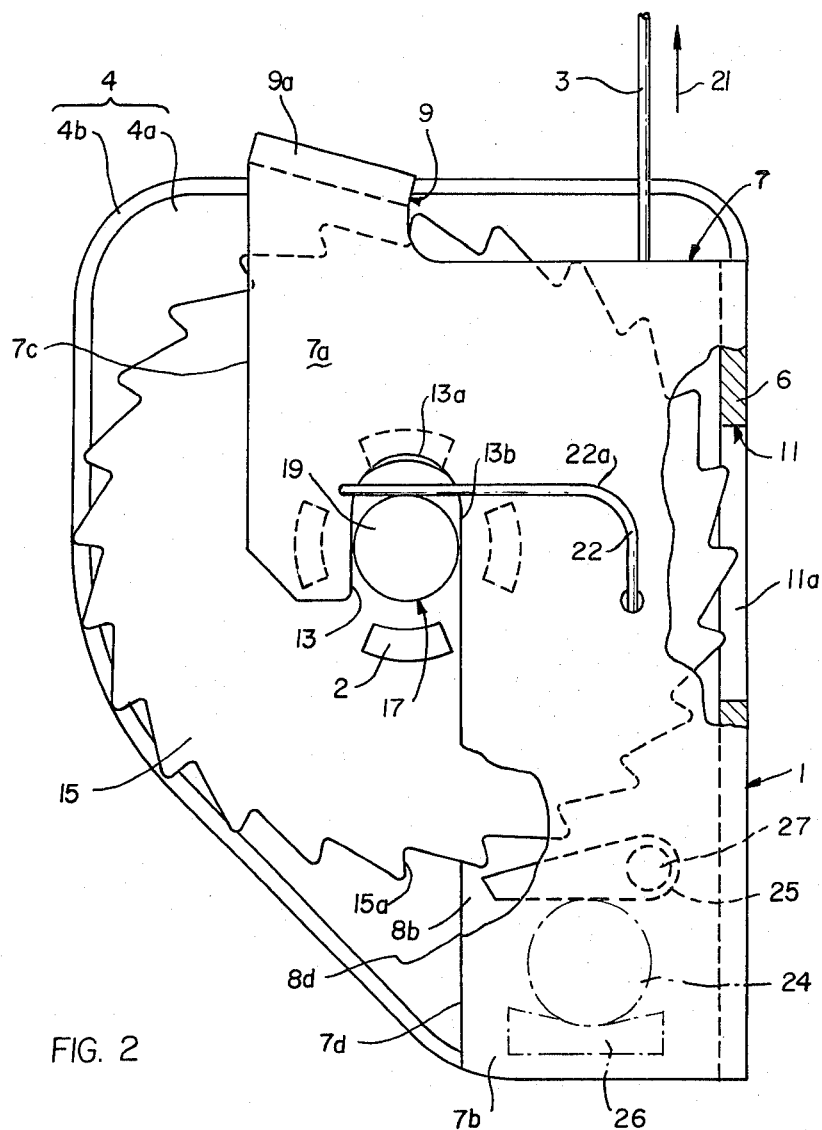
Figure 3:
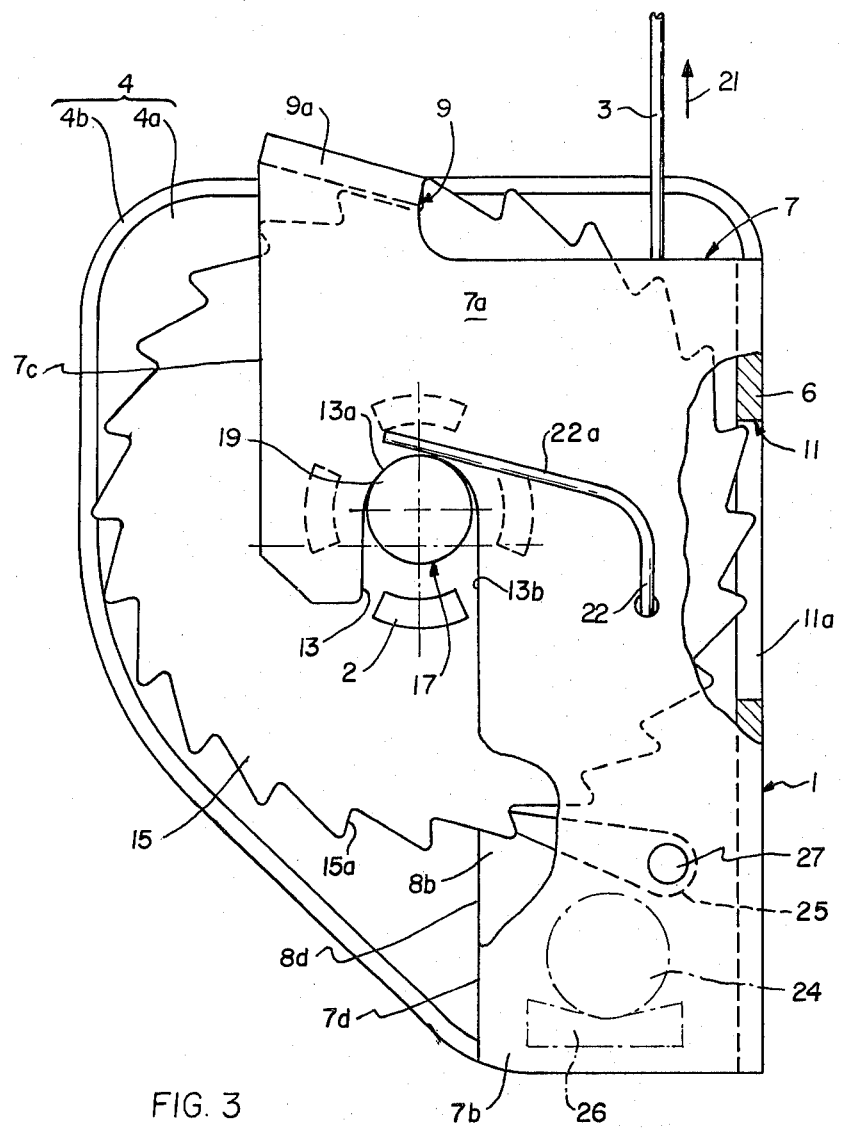
Figure 4:
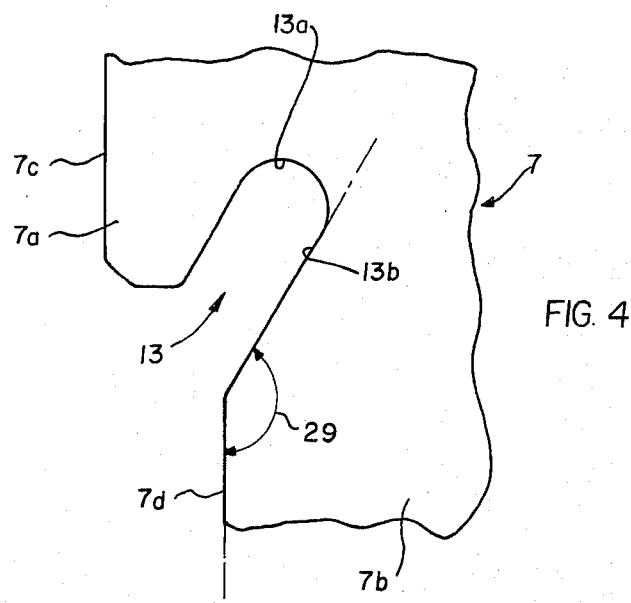
Figure 5:
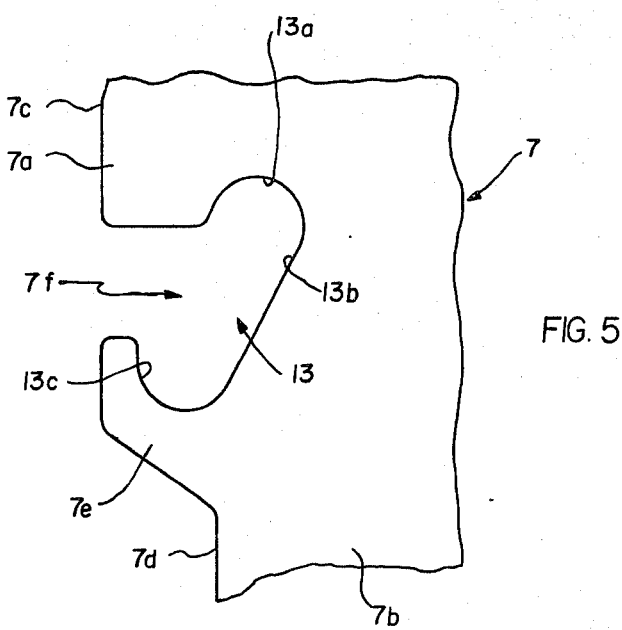

In the following description, embodiments of the device according to the invention are described by way of example with reference to the drawing, in which:

FIG. 1 is a perspective exploded view of a first embodiment;

FIGS. 2 and 3 each show a view of the assembled device according to FIG. 1 from the right, without the front sensor component, in the neutral position and the blocked position respectively;

FIG. 4 is the side view, similar to FIGS. 2 and 3, of the housing of a second embodiment in the zone of the elongated slot of same; and FIG. 5 is the side view similar to FIG. 4, of the housing of a third embodiment.

The device consists substantially of a U-shaped housing 1 of metal, in particular sheet steel, a winding-on shaft 2 for a belt 3, a belt rewinding unit 4 and a sensor component 5.

The housing has a bottom 6 as well as two parallel sides 7 and 8 positioned at a right angle to the bottom 6. The sides 7 and 8 extend over the entire length of the housing 1 and are both substantially L-shaped, so that in the upper region of the housing 1 they display a broader section 7a and 8a respectively, and in the remaining region of the housing 1 a narrower section 7b and 8b respectively. The longitudinal edges 7c and 8c of the two broader sections 7a and 8a, which edges are parallel to the bottom 6 and face away from the bottom 6 of the housing 1, are therefore further removed from the bottom 6 than the longitudinal edges 7d and 8d of the two narrower sections 7b and 8b of the two sides 7 and 8, which edges are also parallel to the bottom 6 and face away from same.

The housing 1 is furthermore provided with two pairs of locking cams 9 and 10 and 11 and 12 respectively, as well as with two elongated slots 13 and 14. The latter extend in each instance in the one side 7 and in the other side 8 respectively, substantially parallel to the bottom 6 of the housing 1, and both are closed at the upper end 13a and 14a respectively. These elongated slots 13 and 14 are arranged in such a manner that they extend from the longitudinal edges 7d and 8d of the narrower sections 7b and 8b of the sides 7 and 8, to the closed ends 13a and 14a in the broader sections 7a and 8a of the sides 7 and 8 of the housing 1.

The first two locking cams 9 and 10 of the housing 1 are formed by two tongues 9a and 10a, which, in the described embodiment, at the upper end of the housing 1 are bent inwards towards one another from the two sides 7 and 8 or the broader sections 7a and 8a of same.

So as to provide the other two locking cams 11 and 12 of the housing 1, the latter is provided with two openings 11a and 12a, i.e. in the zone of the broader sections 7a and 8a of the sides 7 and 8. The upper edges of the two openings 11a and 12a form in each instance the locking cams 11 and 12 respectively next to sides 7 and 8.

The hollow, tubular winding-on shaft 2 is provided at both ends with a locking disc 15 and 16 respectively, which have teeth 15a and 16a on their outer periphery, and which are connected to the winding-on shaft 2 in such a manner that they rotate together. The two outer ends 17 and 18 of the winding-on shaft 2, which protrude beyond the locking discs 15 and 16, are both journal-shaped and provided with an annular groove 17a and 18a respectively. The two ends 17 and 18 are formed by the two ends of a shaft 19 made of plastic which is inserted in the winding-on shaft 2 and passes through the two locking discs 15 and 16. The winding-on shaft 2 on the other hand is made of metal, including the two locking discs 15 and 16.

The belt 3 to be wound onto and off the winding-on shaft 2 extends with a loop-shaped end 3a through an elongated slots 2a of the winding-on shaft 2 into this shaft, in which the belt 3 is fastened by a longitudinal pin 20 extending through the loop-shaped end 3a. The belt 3 can be pulled out of the device in the direction of the arrow 21, when it unwinds from the winding-on shaft 2, and can be pulled back into the device against the direction of the arrow 21, when it is wound onto the winding-on shaft 2.

The winding-on shaft 2 is arranged between the two sides 7 and 8 of the housing 1, and is supported with the two journal-shaped ends 17 and 18 in the two elongated slots 13 and 14 of the housing 1 adjacent the locking cams, in such a manner that it can turn and can also move cross-wise against the action of a spring-loading in the pulling-out direction 21 of the belt, so that the teeth 15a and 16a of the two locking discs 15 and 16 can engage with the first two locking cams 9 and 10, and with the second two locking cams 11 and 12, in which case any turning of the winding-on shaft 2 in the housing 1 in the pulling-out direction 21 of the belt is securely blocked.

According to FIG. 1, so as to ensure the spring-loading of the winding-on shaft 2, the housing 1 is provided with two springs 22 and 23, which in each instance engage at the one end 17 and the other end 18 respectively of the winding-on shaft 2, and which have a leg 22a and 23a respectively, which cross over the respective elongated slot 13 and 14 of the housing 1 through which the respective journal-shaped end 17 and 18 respectively of the winding-on shaft 2 projects, the legs 22a and 23a engaging in the annular grooves 17a and on ends 17 and 18 of shaft 19, so as to position the winding-on shaft 2 axially.

In place of the two springs 22 and 23 it is also possible to provide, for example, a spring which extends cross-wise over the housing 1 with two legs equivalent to the legs 22a and 23a, which spring, the same as the springs 22 and 23, is made of spring wire. It is also possible that for the spring-loading of the winding-on shaft 2 against the pulling-out direction 21 of the belt, only one spring 22 or 23 is provided at the one or the other end 17 or 18 of the winding-on shaft 2.

The belt rewinding unit 4 and the sensor unit 5 are fastened to the outside of the two sides 7 and 8 of the housing 1 which is mirror-symmetrical with regard to its center longitudinal plane, and are broader than the sides 7 and 8, in particular also broader than the broad sections 7a and 8a. They, therefore, determine the outside profile of the device and consist in each instance of an inner spring cassette 4a with at least one coil spring for the rewinding of the belt 3 onto the winding-on shaft 2, which spring therefore engages with the winding-on shaft 2 so as to pull the belt 3 back into the device against the pulling-out direction 21 of the belt and wind it onto the winding-on shaft 2, and with an outer cover 4b, or of an inner sensor cassette 5a which accommodates a mechanism 5b for the motor vehicle sensitive initiation of the blocking of the winding-on shaft 2 in the housing 1, and an outer cover 5c. The two cassettes 4a and 5a are made of plastic, and the same applies to the two covers 4b and 5c.

The spring cassette 4a and the sensor cassette 5a each have an elongated slot 4c and 5d. The two elongated slots 4c and 5d are flush with the elongated slots 13 and 14 in the two sides 7 and 8 of the housing 1, and hold the journal-shaped ends 17 and 18 of the winding-on shaft 2, which ends project through the elongated slots 13 and 14. Normally, i.e. when the device is in the neutral position, the two springs 22 and 23 with the legs 22a and 23a press the winding-on shaft 2 with the two ends 17 and 18 against the bottom ends of the two elongated slots 4c and 5d.

The mechanism 5b provided in the sensor cassette 5a for initiating the blocking of the winding-on shaft 2 in the pulling-out direction 21 of the belt whenever the motor-vehicle fitted with the device exceeds a certain acceleration or braking, comprises a movably arranged inertia element 24 in the form of a sphere and a pivoting lock pawl 25, which can be pivoted by the inertia element 24 so as to engage with the teeth 15a of the locking disc 15 of the winding-on shaft 2. The inertia element 24 rests in a dish 26 with a conical bottom, and the lock pawl 25 is arranged on the inside of the narrower section 7b of the side 7 of the housing 1, i.e. fastened to a pivot 27 which is positioned rotatably in the side 7 and protrudes into the mechanism 5b through an opening 28 in the sensor cassette 5a.

With the embodiment according to FIGS. 1 to 3, the two elongated slots 13 and 14 of the housing 1 are disposed in the broader sections 7a, 8a of the sides and face towards the narrower sections 7b, 8b. The slots extend parallel to the bottom 6 of housing 1, and the same applies to the longitudinal edges 7c and 8c of the broader sections 7a and 8a and to the longitudinal edges 7d and 8d of the narrower sections 7b and 8b of the two sides 7 and 8 of the housing 1. With this, the elongated slots 13 and 14 of this embodiment are arranged in such a manner that the side flanks 13b and 14b of the elongated slots 13 and 14, adjacent to the bottom 6 of the housing 1, are continuations of the longitudinal edges 7d and 8d of the narrower sections 7b and 8b of the sides 7 and 8 of the housing 1, i.e. extend in the same plane parallel to the bottom 6 as the said longitudinal edges 7d and 8d, and the enclosed ends 13a, 14a of the slots face towards the locking cams 9, 10.

The embodiment according to FIG. 4 only differs from that of FIGS. 1 to 3 in that the two elongated slots 13 and 14 of the housing 1 are inclined towards its bottom 6. With this the side flanks 13b and 14b of the elongated slots 13 and 14 adjacent to the bottom 6 form a blunt angle 29 with the longitudinal edges 7d and 8d of the narrower sections 7b and 8b of the two sides 7 and 8 of the housing, which longitudinal edges extend parallel to the bottom 6.

The embodiment according to FIG. 5 differs from that of FIG. 4 in that the two elongated slots 13 and 14 of the housing 1 inclined towards the bottom 6 of the housing 1 are in each instance closed not only at the upper end 13a and 14a respectively, but also at the bottom end 13c and 14c respectively shown in FIG. 5. To this effect the sides 7 and 8 of the housing 1 are each provided with a hook-shaped section 7e (shown in FIG. 5 on one side), which extends from the longitudinal edges 7d and 8d of the narrower sections 7b and 8b towards the longitudinal edges 7c and 8c of the broader sections 7a and 8a of the sides 7 and 8 of the housing 1, forming at the latter longitudinal edges 7c and 8c two inlet openings 7f (shown on one side only in FIG. 5) for the winding-on shaft 2, and encircling the bottom ends 13c and 14c of the elongated slots 13 and 14 of the housing 1, which ends are adjacent to the narrower sections 7b and 8b of the sides 7 and 8.

When assembling the device described in the foregoing, one proceeds in such a manner that first of all the unit consisting of the winding-on shaft 2 with the two locking discs 15 and 16 as well as the shaft 19 is put into the housing 1, in the case of the embodiments according to FIGS. 1 to 3 and 4, respectively, from below; and in the case of the embodiment according to FIG. 5, through the inlet openings 7f and 8f from the side facing away from the bottom 6 of the housing 1, so that the journal-shaped ends 17 and 18 of the winding-on shaft move into the elongated slots 13 and 14 of the housing 1, in which beforehand the two springs 22 and 23 as well as the lock pawl 25 have been arranged. Subsequently, the belt rewinding unit 4 and the sensor unit 5 are moved towards the housing 1 from opposite directions in such a manner that the ends 17 and 18 of the winding-on shaft 2, into the annular grooves 17a and 18a of which the springs 22 and 23 engage with their legs 22a and 23a, come to rest in the elongated slots 4c and 5c of the spring cassette 4a and the sensor cassette 5a respectively. The units 4 and 5 are then fastened to the housing 1. Finally the loop-shaped end 3a of the belt 3 is inserted into the winding-on shaft 2 through the elongated slot 2a, and fastened in this shaft 2 by means of the longitudinal pin 20. The assembling of the device is now complete.

The method of operation of the device can be noted from FIGS. 2 and 3. In the neutral position shown in FIG. 2 the two springs 22 and 23 press the winding-on shaft 2 downwards against the pulling-out direction 21 of the belt, so that the two ends 17 and 18 of the winding-on shaft 2 lie against the bottom ends of the two elongated slots 4c and 5d of the spring cassette 4a and the sensor cassette 5a respectively, and the two locking discs 15 and 16 of the winding-on shaft 2 are disengaged from the first two locking cams 9 and 10 as well as the second two locking cams 11 and 12 of the housing 1. The teeth 15a and 16a of the two locking discs 15 and 16 may, for example, be arranged at a distance of about 1 mm from the locking cams 9 and 11 and 10 and 12 respectively. As a result thereof the winding-on shaft 2 can turn freely in the housing 1, so that the belt 3 can be pulled out in the direction of the arrow 21, when it unwinds from the winding-on shaft 2, which is held in the bottom neutral position shown in FIG. 2 by the force of the springs 22 and 23 against the pulling-out force of the belt 3, or so that the belt 3 can be pulled back into the device in the opposite direction to the arrow 21, when it is wound onto the winding-on shaft 2, which is turned in the direction of the arrow 30 (FIG. 1) by the rewinding spring or the rewinding springs arranged in the spring cassette 4a.

The device is fastened to the motor-vehicle by means of a screw screwed into a central opening 31 (FIG. 1) provided in the bottom 6 of the housing 1, in such a manner that the bottom 6 of the housing 1 extends substantially parallel to the pulling-out direction 21 of the belt.

When the motor-vehicle experiences an acceleration or deceleration which exceeds a certain limit-value, then the spherical-shaped inertia element 24 moves out of the neutral position shown in FIG. 2, swinging the lock pawl 25 into the position shown in FIG. 3, so that it engages with the toothing 15a of the locking disc 15. When now a pull is exerted on the belt 3 in the pulling-out direction 21 of the belt, due to the fact that the person sitting in the motor-vehicle and who has put the safety belt on, is slung forward, because of the locking disc 15 resting on the lock pawl 25 this immediately results in that the winding-on shaft 2 moves crosswise in the pulling-out direction 21 of the belt in the two elongated slots 13 and 14 of the housing 1, against the action of the two springs 22 and 23, so that the teeth 15a and 16a of the two locking discs 15 and 16 engage with the corresponding locking cams 9 and 11 and 10 and 12 respectively of the housing 1. Any turning of the winding-on shaft 2 in the housing 1 is then securely and reliably prevented. With this the lock pawl 25 can be made sufficiently resilient, so that in the case of a blocking it can be compressed, so that the aforementioned engaging of the winding-on shaft 2 and the housing 1 is positively ensured. The lock pawl 25 can, for example, be made of a stable, sufficiently resilient plastic.

As soon as the pull exerted on the belt 3 stops, the winding-on shaft 2 is turned back in the direction of the arrow 30 as per FIG. 1 by the rewinding spring or rewinding springs provided in the spring cassette 4a, so that the device moves back from the blocked position shown in FIG. 3 into the neutral position shown in FIG. 2.

In addition to the aforementioned vehicle-sensitive method of operation, the device can also act in a belt-sensitive manner, when the winding-on shaft 2 is moved from the neutral position shown in FIG. 2 into the blocked position shown in FIG. 3 without the aid of the inertia element 24 and the coming into operation of the lock pawl 25. When the belt 3 is pulled with a sufficiently great jerk in the pulling-out direction 21 of the belt, the winding-on shaft 2, as a result of its inert mass, is pulled up from its neutral position shown in FIG. 2 into its blocked position shown in FIG. 3 against the force of the two springs 22 and 23. With this the beginning of this pulling up, i.e. the response of the device with a belt-sensitive method of operation, can easily be adjusted by suitably selecting the force with which the two springs 22 and 23 act on the winding-on shaft 2 against the pulling-out direction 21 of the belt.

I claim:

1. In a seat belt retractor, in particular for motor-vehicles, including a U-shaped housing including a bottom and two upstanding parallel sides positioned at right angles to the bottom, the housing further including two locking cams and two adjacent elongated slots that each have at least one closed end and which are disposed in the one and the other side, respectively, of the housing, extending in a direction generally parallel to the pulling-out direction of the belt, and a winding-on shaft for the belt, the shaft including at its opposite ends locking discs including locking teeth on the outer peripheries thereof, means for spring loading the winding-on shaft for movement away from the locking cams, said shaft supported in the elongated slots of the housing in such a manner that they can rotate and move crosswise in the slots against the action of said spring-loading means in the withdrawal direction of the belt, so that the teeth of the locking discs can engage in the locking cams of the housing, the improvement comprising:

said housing sides extend substantially over the entire length of the housing and are in each instance approximately L-shaped with broader and narrower sections, each of the broader sections having a side generally facing towards each of said narrower sections; said locking cams of the housing being provided in the zone of broader sections of the sides and said two elongated slots extending into the broader sections so that their closed ends face towards the locking cams and their open sides are situated on the side of the broader sections which face the narrower section.

2. The improvement in a seat belt retractor as claimed in claim 1, said elongated slots extending parallel to the bottom of the housing and including side flanks adjacent the housing bottom that form continuations of the longitudinal edges of the narrower sections of said sides, said longitudinal edges extending parallel to the housing bottom.

3. The improvement in a seat belt retractor as claimed in claim 1, wherein said elongated slots are inclined towards the bottom of the housing and including side flanks adjacent the housing bottom that form a blunt angle with the longitudinal edges of the narrower sections of the sides of the housing; said longitudinal edges extending parallel to the housing bottom.

4. The improvement in a seat belt retractor as claimed in claim 3, wherein said elongated slots are closed at both ends; the sides of the housing are provided with a hook-shaped section extending from the longitudinal edges of the narrower sections of said sides to the longitudinal edges of the broader sections of the sides; the last-mentioned longitudinal edges forming inlet openings into the slots for receiving the winding-on shaft; each hook-shaped section arranged to encircle the end of the elongated slot adjacent said narrower sections of the housing sides.

5. The improvement in a seat belt retractor as claimed in claim 1, wherein the locking cams of the housing are formed by a pair of bent-in tongues at the ends of the broader sections of the housing sides located away from the adjacent narrower section.

6. The improvement in a seat belt retractor as claimed in claim 1, said housing having openings including end edges disposed in the bottom of the housing; said end edges constituting a pair of locking cams adjacent said slots; said end edges disposed in the bottom of the housing opposite the broader sections of the sides.

7. The improvement in a seat belt retractor as claimed in claim 1, wherein the spring-loading means comprises a spring arranged to contact the opposite ends of the winding-on shaft and bias same in a direction away from the closed end of the slot.

8. The improvement in a seat belt retractor as claimed in claim 7, wherein the winding-on shaft has journal shaped ends including annular peripheral grooves; and said spring has a pair of legs crossing said elongated slots, said legs engaging said annular grooves.

9. The improvement in a seat belt retractor as claimed in claim 1, wherein the spring-loading means comprises at least one spring mounted on the housing and contacting at least one end of the winding-on shaft.

10. The improvement in a seat belt retractor as claimed in claim 9, wherein the spring includes a leg crossing the respective elongated slot of the housing; said winding-on shaft including journal-shaped ends; said journal-shaped ends extending through the respective slots; at least one of said journal-shaped ends of the winding-on shaft including an annular peripheral groove; said spring leg engaging said annular groove.

11. The improvement in a seat belt retractor as claimed in claim 1, wherein said housing is made of metal and the winding-on shaft is provided at its opposite ends with a journal made of plastic, said journal extending through an adjacent elongated housing slot.

12. The improvement in a seat belt retractor as claimed in claim 1, wherein said housing is designed so that it is mirror-symmetrical with regard to a central longitudinal plane.

13. The improvement in a seat belt retractor as claimed in claim 1, wherein a pair of units each comprising an elongated support slot is disposed on the outside of the housing sides, said support slots being flush with the first-mentioned slots in the housing sides and accommodating opposite ends of the winding-on shaft; said winding-on shaft ends extending through said support slots.

14. The improvement in a seat belt retractor as claimed in claim 13, wherein said support slots are made of plastic.

15. The improvement in a seat belt retractor as claimed in claim 13, wherein said support slots each comprise part of a belt rewinding spring cassette and a sensor cassette, respectively, said cassettes being broader than the sides of the housing.

16. The improvement in a seat belt retractor as claimed in claim 18, including an inertia locking actuator for the retractor; said inertia actuator including a movable arranged inertia element and a pivoting lock pawl movable by said inertia element in a direction that causes its engagement with the teeth of at least one locking disc of the winding-on shaft; rotation of said winding-on shaft in the belt withdrawal direction causing movement of said winding-on shaft across its respective housing slot so that its teeth engage said locking cams.

17. The improvement in a seat belt retractor as claimed in claim 16, said retractor including a belt rewinding spring cassette and a sensor cassette disposed adjacent said housing side; said inertia element disposed in the sensor cassette.

* * * * *